Feb. 5, 1952 — J. MORKOSKI — 2,584,217
TRACTOR MOUNTED CULTIVATOR
Filed July 24, 1947 — 2 SHEETS—SHEET 1

Inventor
James Morkoski
By Paul O. Pippel
Atty.

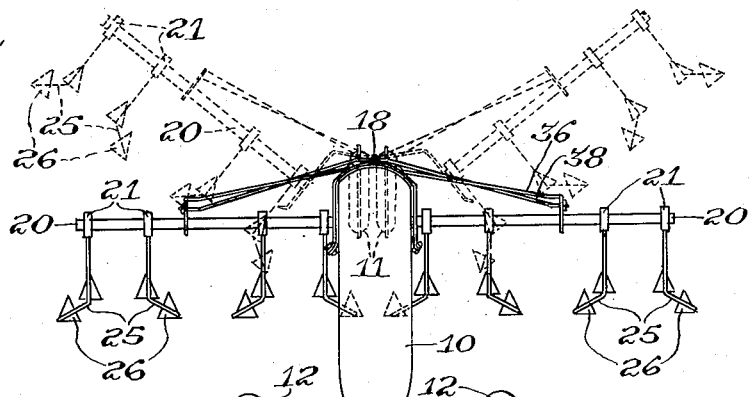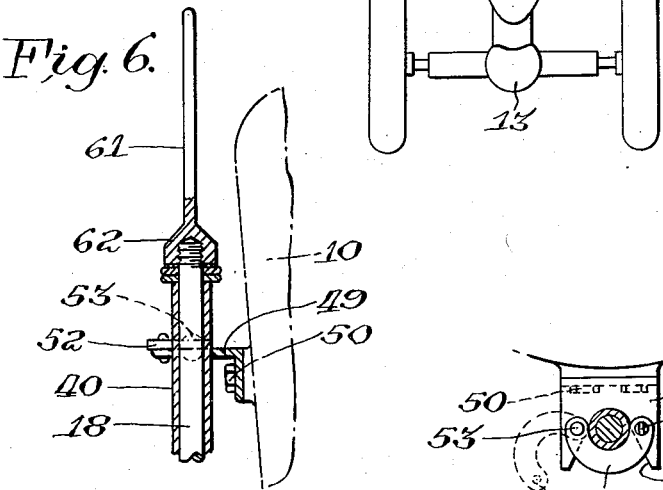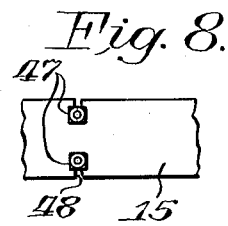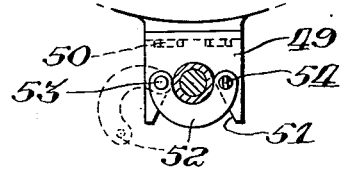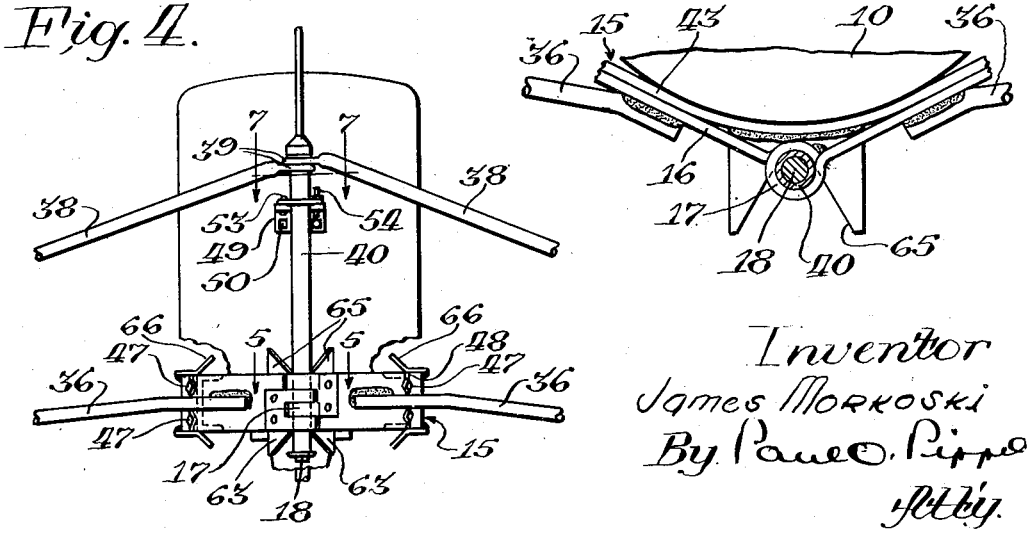

Patented Feb. 5, 1952

2,584,217

UNITED STATES PATENT OFFICE 2,584,217

TRACTOR MOUNTED CULTIVATOR

James Morkoski, Canton, Ill., assignor to International Harvester Company, a corporation of New Jersey Application July 24, 1947, Serial No. 763,195

12 Claims. (Cl. 97—47)

This invention relates to agricultural implements and particularly to cultivators. More specifically the invention concerns a tractor-mounted cultivator or the like and means for facilitating attachment of the implement to the tractor and its removal therefrom.

The larger sizes of tractor-mounted implements, such as cultivators, are very heavy and sometimes the services of several men are required to mount the cultivator upon the tractor and to remove it. It is the principal object of the present invention, therefore, to provide improved means for mounting an implement upon a tractor or the like.

Another object of the invention is to provide a tool-carrying frame of novel construction incorporating means facilitating its attachment to and removal from a tractor.

Another object of the invention is to provide a cultivator frame having parts adapted for attachment to opposite sides of a tractor and provided with a hinge to facilitate attachment to and removal of the implement from the tractor.

A further object of the invention is to provide a means for mounting an implement such as a heavy cultivator frame upon a tractor with a minimum expenditure of time and energy.

Another object of the invention is to provide a hinged cultivator frame arranged to extend laterally from opposite sides of the tractor by which it is supported, and hinged to accommodate relative movement of parts of the frame.

With these and other objects in view, which will become clear from the detailed description to follow, the invention contemplates the provision of a cultivator supporting frame or the like and a complementary tractor attaching structure whereby a tractor operator may drive the tractor to such a position with respect to the implement that the implement may be secured thereto substantially without manual lifting of any part of the implement. Detachment of the implement from the tractor is accomplished equally easily. Provision is made to compensate for irregularities in the position of the implement with respect to the tractor attaching structure so that when the tractor approaches and is driven into the implement the implement is lifted into position.

Figure 1 of the drawings is a plan view of the forward end of a tractor showing a portion of a cultivator attached thereto;

Figure 3 is a diagrammatic plan view of a tractor showing a multi-row cultivator embodying the features of the present invention mounted thereupon and showing in dotted lines the position of the implement at one stage of disconnection thereof from the tractor;

Figure 4 is an elevation of the front end of the tractor showing the hinge connection between the parts of the cultivator frame and showing the manner of connection thereof to the tractor;

Figure 5 is a sectional view taken on the line 5—5 of Figure 4 and looking in the direction of the arrows;

Figure 6 is a side elevation partly in section showing the extension of the hinge and the guiding means mounted thereupon;

Figure 7 is a sectional view taken on the line 7—7 of Figure 4 looking in the direction of the arrows and showing the latch mechanism for connecting the hinge pin to the front end of the tractor; and Figure 8 is a detail of a portion of the mechanism by which the implement is attached to the tractor attaching plate.

Figure 1:
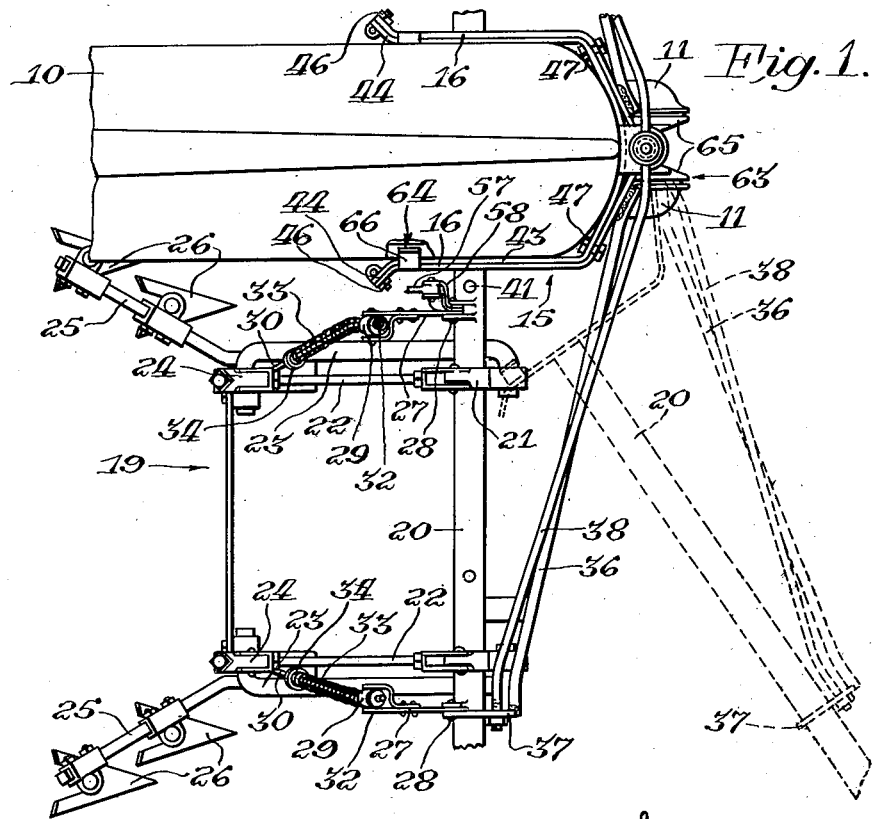

Referring to the drawings, the numeral 10 designates the body of a tractor having dirigible front wheels 11. In Figure 3 the tractor is illustrated as having rear drive wheels 12 and an operator's station 13.

Figure 2:
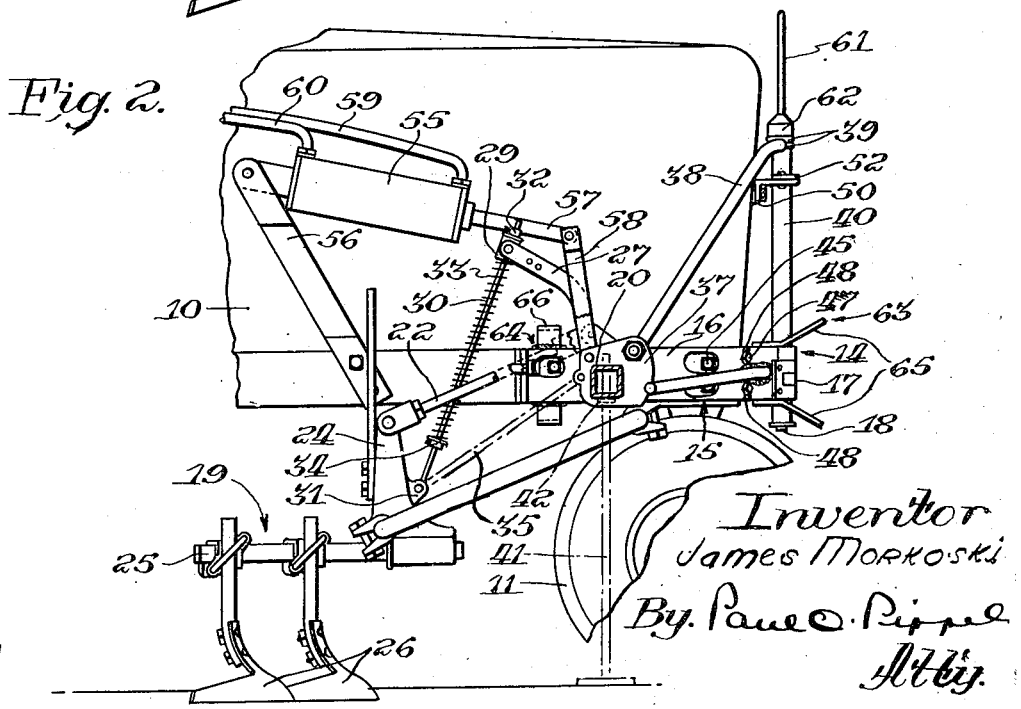
Figure 2 is a side elevation of the structure shown in Figure 1.

The implement of the present invention is a four-row cultivator shown diagrammatically in its entirety in Figure 3. The implement comprises a frame generally designated by the numeral 14 which extends laterally from opposite sides of the tractor and includes a U-shaped frame member 15 extending horizontally around the front end of the tractor and having rearwardly extending arms 16. The forward ends of the arms 16 meet at the front of the tractor and are connected for pivotal movement about a vertical axis by a hinge structure 17 including a vertically extending hinge pin 18. Each of the arms or plates 16 serves for the attachment thereto of a tool section 19. These tool sections are substantial duplicates and a description of one will suffice for both. Tool section 19 includes a transversely extending tool bar 20 square in cross-section, as indicated in Figure 2, affixed at its inner end to the arm 16 and extending laterally therefrom to serve as a support for the earth-working implements.

The tool bar 20 has attached thereto by brackets 21 a plurality of upper and lower parallel links 22 and 23 respectively. These parallel links extend rearwardly and are pivotally connected at their rear ends to a vertically extending bracket 24. A number of such parallel link structures are provided at laterally spaced locations on the tool bar 20 and at each side of the tractor. Each of the brackets 24 has attached thereto a drag link 25 upon which is mounted a number of cultivator shovels 26. Each of the pairs of parallel links 22 and 23 with the earth-working tools mounted thereupon is capable of independent vertical movement with respect to the tool bar 20 and with respect to the tractor upon which the implement is mounted. The implement is resiliently urged into ground-working position by mechanism including an arm 27 pivotally mounted upon a pin 28 carried by a lug secured to the tool bar 20. The end of arm 27 is bifurcated and has pivotally mounted upon the end thereof a swivel member 29 centrally bored to receive for sliding movement a rod 30, the lower end of which is connected to a lug 31 secured to the bracket 24. A collar 32 is provided at the upper end of the rod 30 and a spring 33 surrounds the portion of the rod between the arm 27 and the lug 31. The tension upon the spring 33 is adjustable by a collar 34 which abuts the lower end of the spring. Upon upward movement of the parallel link structures therefore, the rod 30 slides in the swivel 29 and the spring 33 urges the tool to return to its operating position. Each set of parallel links 22 and 23 is optionally held against vertical movement with respect to the tool bar and the tractor by a rod 35 removably connected to the bracket 21 and to the lug 31 for a purpose which will hereinafter become clear. Each of the tool bars 20 is braced by a rod 36 which is welded at its outer end to a bracket 37 mounted upon the tool bar 20 and at its other end to the arm or plate member 16. Further bracing is provided by a rod 38, one end of which is threaded for reception in a threaded opening in the bracket 37 and the other end of which is provided with an eye 39 adapted to receive the upper end of a sleeve member 40 surrounding the hinge pin 18.

When disconnected from the tractor the cultivator attachment of the present invention is self-supported and is maintained substantially in the position that it will occupy when it is connected to the tractor by a supporting rod 41 which extends through an opening provided in the tool bar 20 and rests upon the ground. The standard 41 is easily removed when the implement has been attached to the tractor and is provided with a collar 42 to hold it in position when in use. A plurality of such standards 41 are provided and they with the cultivator shovels 26 resting upon the ground function to render the implement self-supporting.

An attaching plate 43 is provided upon the tractor for the connection thereto of the cultivator. This member 43 is shaped similarly to the member 15 and is coextensive therewith. The arms 44 of the member 43 extend rearwardly and are secured to the side of the tractor by bolts 45 shown in Figure 2. When attached to the tractor the implement is secured to the attaching plate 43 by a bolt 46 provided at the rear end of each of the arms 44 and receivable in an opening in the arm 16 of the hinged member 15. Additional bolts 47 are provided for reception in open-ended slots 48 in the member 15. Further connection between the implement and the tractor is provided by a latch shown in Figure 7 and comprising a plate 49 affixed to the front of the tractor by bolts 50. Plate 49 is provided with a V-shaped notch 51 adapted to receive the sleeve 40 enclosing the hinge pin 18. An arcuate latch member 52 is pivoted upon a pin 53 in the plate 49 and in the solid line position shown in Figure 7 is releasably connected to the plate by a removable pin 54 at the opposite side of the sleeve 40. The plate 49 and the latch member 52 thus serve to confine the upper portion of the sleeve member 40 and assist in holding the implement in position upon the tractor. A further function of the latch member 52 and of the V-shaped notch 51 in the plate 49 will become clear hereinafter.

When the implement has been mounted upon the tractor it is vertically moved between operating and transport positions by mechanism including a hydraulic cylinder 55 anchored upon a bracket 56 secured to the side of the tractor. A piston 57 slidable in the cylinder 55 is pivotally connected at its outer end to a rock-shaft 58 mounted upon one of the pins 28 carried between a pair of lugs secured to the tool bar 20 and is affixed at its lower end to the arm 27. Cylinder 55 is supplied with fluid under pressure through hoses 59 and 60 from a tractor source, not shown. Extension of the piston 57 in cylinder 55 will raise the earth-working tools to transport position by virtue of the connection of rod 30 to the lug 31 and to the arm 27, the arm 27 engaging collar 32 upon rocking the arm 58 to which the arm 27 is secured.

It should now, of course, be clear that each of the tool sections 19 mounted upon the arms 16 of the member 15 is capable of swinging in a horizontal plane about a vertical axis represented by the hinge pin 18. To disconnect the implement from the tractor, therefore, the bolts 46 and 47 are removed and the piston 57 is disconnected from the arm 58. The tractor is then placed in reverse and moved rearwardly. Inasmuch as the latch member 52 is still in engagement with the upper end of the sleeve 40 surrounding the hinge pin, the hinge portion of the implement moves rearwardly. As indicated in dotted lines in Figure 3, with the earthworking shovels 26 in contact with the ground the inner gangs of earth-working tools will move rearwardly to the dotted line position. As soon as this is accomplished the earth-working elements, which are positioned during operation directly under the tractor and behind the front wheels, will not interfere with the passage of the front wheels of the tractor. When the dotted line position of Figure 3 has been assumed by the implement, the tractor operator is then able to place the supporting standards 41 in position to support the implement frame, the links 35 having been placed in position prior to disconnection of the piston 57 from the arm 58. The links 35 are placed in position with the implement resting upon the ground so that the shovels 26 assist the standards 41 in supporting the implement upon its disconnection from the tractor. The tractor operator then moves the pin 54 holding the arcuate latch member 52 in place around the hinge pin and the tractor is free to be driven away from the implement without danger of coming in contact with the cultivator shovels or any other part of the implement.

When the implement is again to be attached to the tractor, the tractor is driven with its front end pointing toward the center of the implement, that is, toward the hinge pin 18. To facilitate the tractor operator in approaching the attaching position with respect to the implement, an indicator or guide member 61 is provided. Guide 61 has an enlargement 62 at its lower end internally threaded for seating upon the threaded upper end of the hinge pin 18. Guide 61 thus serves a dual purpose of holding the brace rods 38 in place and of guiding the tractor operator. By keeping the guide member 61 in his line of vision at the front of the tractor the operator is able to drive his tractor between the tool sections 19 thereof and to bring the tractor to such a position that the hinge pin will be received in the V-shaped notch 51 in plate 49. The shape of this notch facilitates the reception of the hinge pin therein and allows for small variations in the relative positions of the tractor and the implement.

In order to facilitate the connection of the frame member 15 to the tractor and to insure its positioning in engagement with the member 43, socket means 63 and 64 are provided consisting of vertically spaced pairs of plates 65 and 66. Socket member 63 is arranged at the front of the tractor to receive the hinge portion 17 of the member 15 while socket members 64 are provided at the sides of the tractor to receive the arm portions 16. The socket members 63 and 64 are welded to the member 43 and it will be noted that the front socket member 63 is flared both horizontally and vertically as clearly shown in Figure 4. The sleeve 40 holding hinge pin 18 is thus readily guided into the socket 63 and the hinge portion 17 of the attaching plate is also guided into the socket. If the plate is somewhat displaced with respect to the socket member 63, as for instance if it is below the socket, it will be lifted upon advance of the tractor by engagement with the lower plate 65 and raised into attaching position. As soon as the hinge portion 17 is in its socket and the hinge pin has been received in the notch 51, the hinge pin may be locked therein by swinging the arcuate latch member 52 into position. The tractor is then advanced, pushing the inner ends of the gang sections 19 forwardly and causing the sections to swing horizontally about the hinge pin 18 as a pivot. The arms 16 of the member 15 approach and are guided by means of the plates 66 into the sockets 64, whereupon the member 15 is bolted to the member 43. With the attachment of piston rod 57 to the arm 58 and the removal of standards 41 and links 35, the implement is again ready for operation.

It is believed that the operation of the tractor-mounted cultivator of the present invention will be clearly understood from the foregoing description. It should also be understood that the invention has been described only in its preferred embodiment and that modifications may be made therein without departing from the spirit of the invention or the scope of the appended claims.

What is claimed is:

1. In an agricultural machine, a tractor, an implement attachment for the tractor comprising a transverse frame structure adapted to be connected to the forward portion of the tractor to extend laterally from opposite sides thereof, earth-working tools carried by the frame, means for supporting the frame when detached from the tractor in substantially the position it occupies when attached thereto, vertical single hinge means in said frame medially of its ends accommodating swinging movement of one part of the frame with respect to the other, said frame including a central horizontal U-shaped portion having arms extending rearwardly along the sides of the tractor, means on the tractor for releasably connecting said frame thereto at a location adjacent said hinge, and releasable attaching means for rigidly connecting the parts of the frame to the tractor at locations remote from said hinge means, whereby the frame parts may be swung about said hinge means away from the tractor to facilitate removal of the implement.

2. In an agricultural machine, a tractor, an implement attachment for the tractor comprising a transverse frame structure including a pair of tool-supporting sections adapted to be releasably attached to and extend laterally from opposite sides of the tractor adjacent the front end thereof, means for supporting the frame structure when detached from the tractor in substantially the position it occupies when attached thereto, single hinge means in said frame between said tool sections accommodating relative swinging movement thereof in a horizontal plane, bracing means between the frame and the hinge means, and indicating means carried by the implement to guide the tractor operator in placing the tractor in attaching position with respect to the implement, said indicating means comprising a vertical member forming an extension of said hinge means and including means for securing said bracing means to the hinge means.

3. In an agricultural machine, a tractor, an implement attachment for the tractor comprising a transverse frame structure including a pair of tool-supporting sections adapted to be releasably attached to and extend laterally from opposite sides of the tractor adjacent the front end thereof, means for supporting the frame structure when detached from the tractor in substantially the position it occupies when attached thereto, whereby the tractor may be driven by its operator to attaching position with respect to the implement, vertical single hinge means in said frame between said tool sections accommodating relative swinging thereof toward and away from the tractor, and bracing means extending between the frame and said single hinge means, said hinge means including a hinge pin and an elongated vertical extension thereof adapted to secure said bracing means to the hinge means and serving as a guide to the tractor operator in driving the tractor into attaching position with respect to the implement.

4. The combination with a tractor of an implement attachment comprising a member adapted to fit over the forward end of the tractor and having rearwardly extending arms, releasable means rigidly securing said arms to the sides of the tractor, a transverse tool bar secured to each said arm and extending laterally from the respective sides of the tractor, earth-working tools mounted on each said bar for movement between ground engaging and transport positions, and a vertical hinge in said member at the front of the tractor and on the center line thereof accommodating swinging of said tool-bar carrying members, upon release thereof, toward and away from the tractor, whereby the implement may be dissociated with and attached to the tractor by driving the tractor backward or forward between the arms of said member.

5. The combination with a tractor of an implement attachment comprising a member adapted to fit over the forward end of the tractor and having rearwardly extending arms, releasable means rigidly securing said arms to the sides of the tractor, a transverse tool bar secured to each said arm and extending laterally from the respective sides of the tractor, earth working tools mounted on each said bar for movement between ground engaging and transport positions, a single vertical hinge in the center of said member at the front of the tractor accommodating swinging of said tool-bar carrying members, upon release thereof, toward and away from the tractor, whereby the implement may be dissociated with and attached to the tractor by driving the tractor backward or forward between the arms of said member, and an upright member associated with said hinge and projecting thereabove to guide the tractor operator to attaching position with respect to the implement.

6. The combination with a tractor of an implement attachment comprising a member adapted to fit over the forward end of the tractor and including rearwardly extending arms bent laterally at their forward ends and pivotally connected for swinging about a single vertical axis, a transverse tool bar secured to each said arm and extending laterally therefrom, earth working tools mounted on the respective tool bars for movement between ground engaging and transport positions, means for supporting the tool bars when detached from the tractor in substantially the position occupied thereby when attached to the tractor, and attaching means on the tractor including socket means adapted to receive and center said member, said socket means being placed to guide the member into its tractor attached position.

7. The combination with a tractor of an implement attachment comprising a member extending horizontally around the front end of the tractor and having arm portions extending rearwardly along the sides of the tractor, a transverse tool supporting structure secured to each said arm portion and extending laterally from opposite sides of the tractor, earth working tools mounted upon each said tool supporting structure for movement between ground engaging and transport positions, means releasably connecting each said arm portion to the tractor, and a single vertical hinge in said member at the forward end thereof on the center line of the tractor whereby, upon release of said connecting means the said tool supporting structures may be swung horizontally toward and away from the tractor.

8. The combination with a tractor of an implement attachment comprising a member extending horizontally around the front end of the tractor and having arm portions extending rearwardly along the sides of the tractor, a transverse tool supporting structure secured to each said arm portion and extending laterally from opposite sides of the tractor, earth working tools mounted upon each said tool supporting structure for movement between ground engaging and transport positions, means for supporting the implement when detached from the tractor in substantially the position it occupies when attached thereto, means releasably connecting each said arm portion to the tractor, single vertical hinge means in said member at the forward end thereof on the center line of the tractor whereby, upon release of said connecting means the said tool supporting structures may be swung horizontally about said hinge means, and means for releasably connecting said member to the front of the tractor at a location adjacent said hinge means.

9. In an agricultural implement, a tractor, a removable attaching bracket extending horizontally around the front end of the tractor and having arm portions extending rearwardly along the sides thereof, a transverse tool supporting structure adapted to be connected to the forward portion of the tractor comprising a central frame member adapted to conform to the shape of said bracket, a transverse tool bar secured to said frame member on opposite sides of the tractor and extending laterally therefrom, earth working tools mounted upon each said tool bar for movement between ground engaging and transport positions, a single vertical hinge in said central frame member between said tool bars accommodating relative swinging movement thereof, and means releasably connecting said central frame member to said attaching bracket.

10. In an agricultural implement, a tractor, a removable attaching bracket extending horizontally around the front end of the tractor and having arm portions extending rearwardly along the sides thereof, a transverse tool supporting structure adapted to be connected to the forward portion of the tractor comprising a central frame member adapted to conform to the shape of said bracket, a transverse tool bar secured to said frame member on opposite sides of the tractor and extending laterally therefrom, earth working tools mounted upon each said tool bar for movement between ground engaging and transport positions, a single vertical hinge in said central frame member between said tool bars accommodating relative swinging movement thereof, means releasably connecting said central frame member to said attaching bracket, bracing means extending between the tool supporting structure and the hinge, and guide means carried by said attaching bracket to facilitate the attachment of said central member thereto said guide means having means for securing said bracing means to said hinge.

11. In an agricultural implement, a tractor, a removable attaching bracket extending horizontally around the front end of the tractor and having arm portions extending rearwardly along the sides thereof, a transverse tool supporting structure adapted to be connected to the forward portion of the tractor comprising a central frame member adapted to conform to the shape of said bracket, a transverse tool bar secured to said frame member on opposite sides of the tractor and extending laterally therefrom, earth working tools mounted upon each said tool bar for movement between ground engaging and transport positions, a single vertical hinge in said central frame member midway between said tool bars accommodating relative swinging movement thereof, means releasably connecting said central frame member to said attaching bracket, guide means carried by said attaching bracket to facilitate the attachment of said central member thereto, including an upright extension on said hinge arranged to facilitate placement of the tractor in position for attachment of the implement thereto, said extension being cooperable with said hinge to secure said bracing means thereto, and means for releasably securing said upright extension to the front end of the tractor.

12. An implement attachment for a tractor comprising a pair of laterally spaced tool frames adapted for attachment to opposite sides of the tractor, a horizontal U-shaped member adapted to receive the forward end of the tractor, the arms of said U-shaped member extending rearwardly along the sides of the tractor and having the respective tool frames affixed thereto, and a single vertical hinge in said U-shaped member accommodating relative horizontal swinging of said tool frames.

JAMES MORKOSKI.

REFERENCES CITED

The following references are of record in the file of this patent:

UNITED STATES PATENTS

| Number | Name | Date |
|---|---|---|
| 2,063,851 | Ray | Dec. 8, 1936 |
| 2,168,213 | Holy | Aug. 1, 1939 |
| 2,423,148 | Johnson | July 1, 1947 |
| 2,483,011 | Hudson | Sept. 27, 1949 |

FOREIGN PATENTS

| Number | Country | Date |
|---|---|---|
| 560,753 | Germany | Oct. 6, 1932 |